No. 811,191. PATENTED JAN. 30, 1906.
F. P. WHITESIDE.
PULLEY BLOCK.
APPLICATION FILED MAY 19, 1905.
2 SHEETS—SHEET 1.
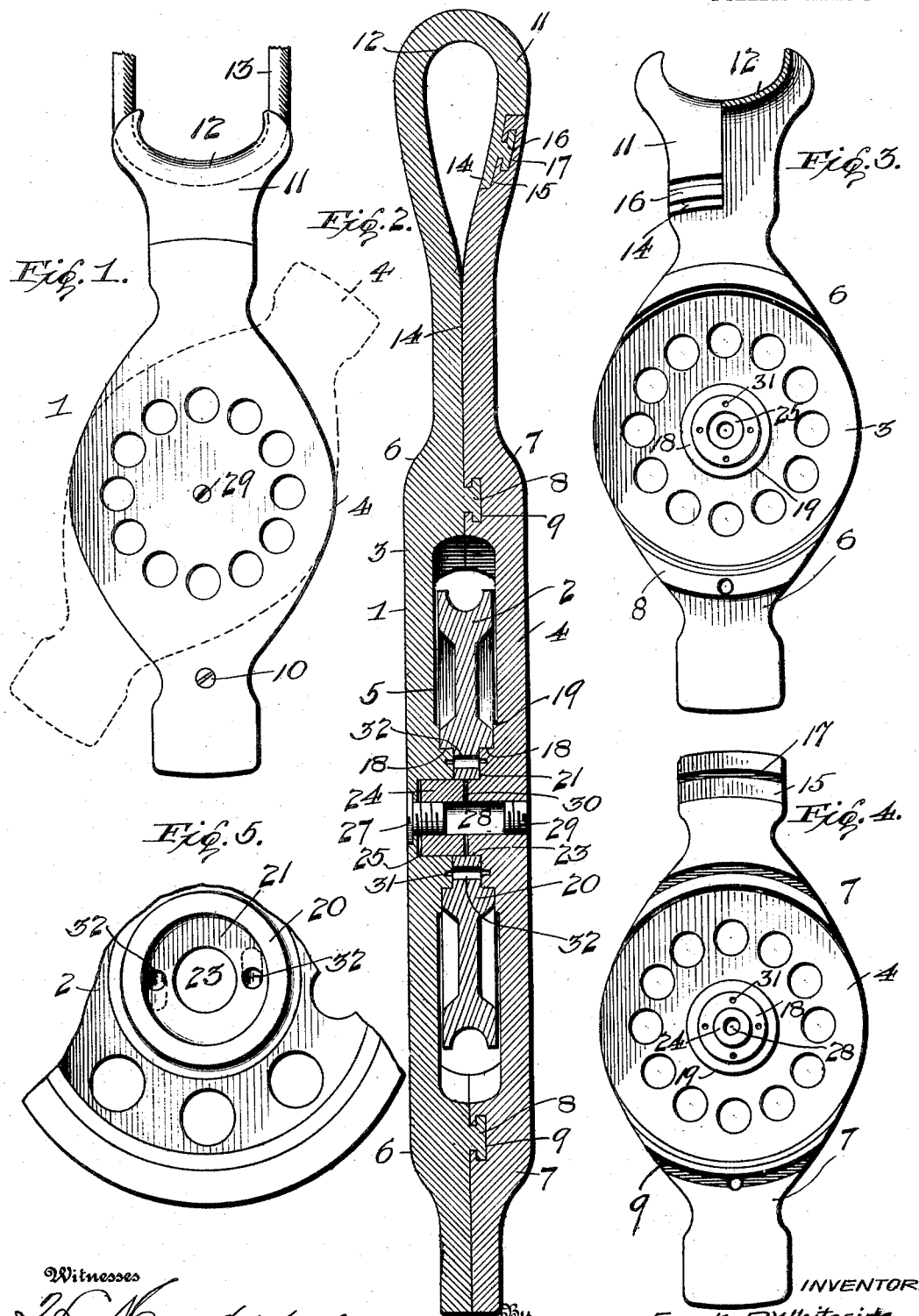
Witnesses
INVENTOR
Frank P. Whiteside
by W. C. Carman
Attorney No. 811,191. PATENTED JAN. 30, 1906.
F. P. WHITESIDE.
PULLEY BLOCK.
APPLICATION FILED MAY 19, 1905.
2 SHEETS—SHEET 2.
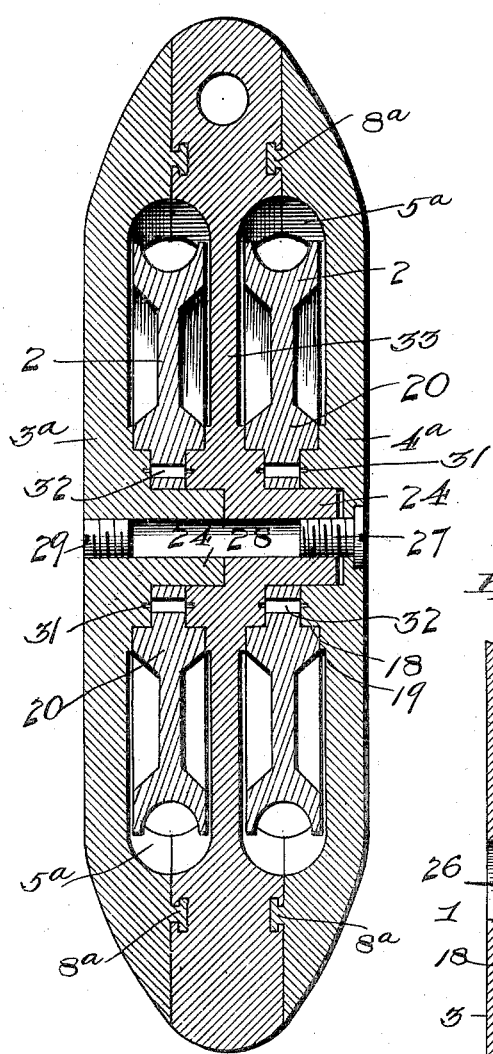
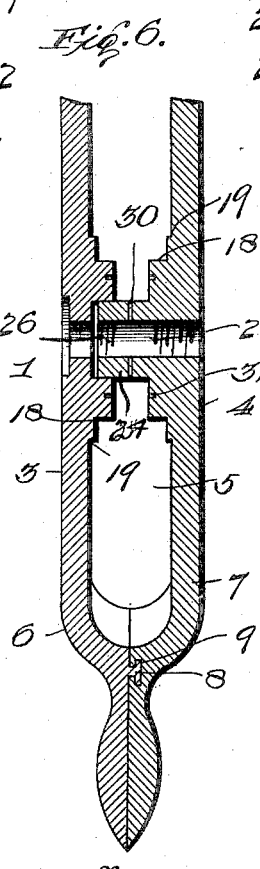
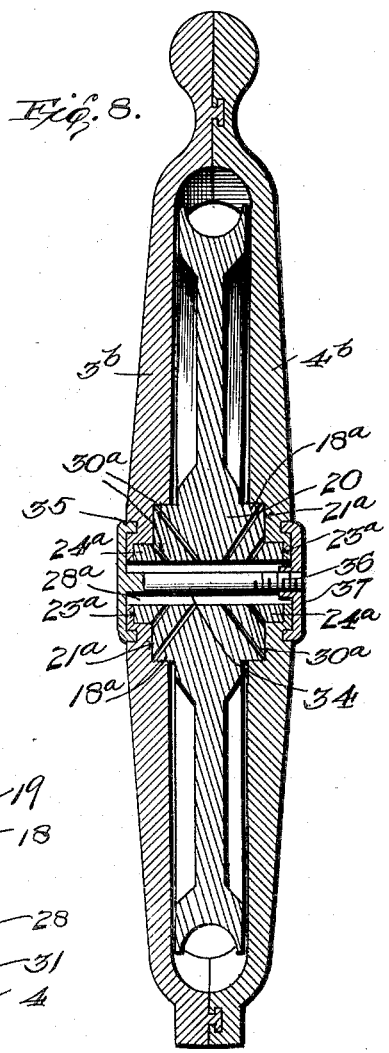
Witnesses
Inventor
Frank P. Whiteside
Attorney

UNITED STATES PATENT OFFICE.

FRANK PAUL WHITESIDE, OF YOUNGSTOWN, OHIO.

PULLEY-BLOCK.

No. 811,191.　　　　Specification of Letters Patent.　　　　Patented Jan. 30, 1906.

Application filed May 19, 1905. Serial No. 261,247.

*To all whom it may concern:*

Be it known that I, FRANK PAUL WHITESIDE, a citizen of the United States, residing at Youngstown, in the county of Mahoning and State of Ohio, have invented new and useful Improvements in Pulley-Blocks, of which the following is a specification.

This invention relates to hoisting appliances, and has specially in view the provision of a simple and thoroughly practical construction of pulley-blocks possessing utility for hoisting purposes generally.

In those types of pulley-blocks (or "pulleys," as they are sometimes termed) in which the sheave or wheel member is mounted upon an axle pin or bolt it is almost impossible to provide such a mounting for the sheave as to insure a true noiseless running thereof. Also in this type of pulley-blocks the absence of an even bearing for the sheave or wheel member results in an uneven running of the latter, with the consequence of quickly impairing the efficiency of the block. Also a common objection to the ordinary pulley-block with an axle pin or bolt is the shearing strain exerted by the sheave on the said pin or bolt, which often entirely cuts away the bearing-support for the sheave. Furthermore, in such construction the sheave readily becomes rusted to its bearings and in being used is very noisy and generally unsatisfactory.

The present invention contemplates a construction having for a general object to obviate all of the foregoing objections to the ordinary type of pulley-block having an axle pin or bolt bearing for the sheave member thereof.

Therefore the primary object of the invention is to provide a construction of pulley-block which entirely dispenses with an axle pin or bolt and provides a rigid bearing for the sheave at a plurality of points and so distributes the bearing-points as to insure an even and true bearing for the sheave.

A further object of the invention is to provide wide strongly-reinforced bearings at opposite sides of the sheave-hub in addition to a central bearing about which the sheave or pulley member rotates, thus equally distributing the strains upon the sheave and correcting any tendency to yield to side strain in any direction. This phase of the invention provides means for taking care of the shearing strain to which pulley-blocks are subjected.

The invention also has for its object the provision of a sectional and separable construction of block the separate sections of which while readily separable are securely interlocked in their matching relation to provide a complete casing or housing for the sheave.

The invention also contemplates a construction of pulley-block which permits of a rope bridle being formed as a part of the block-body.

Though the invention is capable of general application for hoisting purposes, the same possesses special utility for nautical equipment.

With these and other objects in view, which will more readily appear as the nature of the invention is better understood, the same consists in the novel construction, combination, and arrangement of parts, which will be hereinafter more fully illustrated, described, and claimed.

The essential features of the invention involved in carrying out the objects above indicated are necessarily susceptible to structural change without departing from the scope of the invention; but a preferred embodiment thereof is shown in the accompanying drawings, in which—

Figure 1 is a side elevation of a pulley-block embodying the present invention and illustrating one means of hanging the same through the medium of an integral bridle attachment. Fig. 2 is an enlarged central longitudinal sectional view of the pulley-block. Figs. 3 and 4 are inner face elevations, respectively, of the opposite cheek-plates of the single form of pulley-block. Fig. 5 is a detail elevation of a fragment of the sheave or pulley-wheel member, illustrating the preferable arrangement of the suction-holes to provide a pumping action for the lubricant. Fig. 6 is an enlarged detail sectional view of a portion of the single form of block-body, omitting the sheave or wheel member to illustrate more plainly the construction of the bearing-supports for such member. Fig. 7 is a sectional view of a double form of pulley-block, illustrative of the adaptability of the improvements to the formation of multiple pulleys in which two, three, or more sheaves are employed. Fig. 8 is an enlarged sectional view of another modification of the invention, showing the transposition of the bearing-shoulders from the cheek-plates of the block-body to opposite sides of the central hub portion of the sheave or wheel member.

Like reference-numerals designate corresponding parts in the several figures of the drawings.

The invention embodies certain distinctive features common to all modifications thereof—namely, an improved bearing-mounting for the sheave or wheel member and a sectional and separable construction of block-body.

These improvements are well exemplified in the single form of pulley-block illustrated in Figs. 1 to 6, inclusive, of the drawings and to which construction reference will first be made.

The pulley-block in its single form primarily consists of a block-body (designated in its entirety by the numeral 1) and a sheave or wheel member 2, journaled within the block-body and subserving the usual functions of a pulley-wheel. The said block-body is of a sectional and separable construction, the same consisting of the opposite cheek-plates 3 and 4, designed to be securely interlocked in their matching and closed relation, while at the same time being capable of disconnection for the purpose of opening up the block-body through the medium of a rotary or axial movement of the cheek-plates in opposite directions, as plainly indicated by the dotted lines in Fig. 1 of the drawings.

The opposite separably-interlocked cheek-plates 3 and 4 are channeled out upon their inner faces to provide an opening of sufficient size to confine therein the sheave or wheel member 2, while at the same time permitting the free rotation of the latter. At the end of what may be termed the "wheel-opening" 5 of the block-body the cheek-plates 3 and 4 are provided with the matching and interlocked end members 6 and 7, respectively. These end members of the separate cheek-plates are designed to be interlocked through the medium of any suitable mechanical expedients which permit of the separation or disconnection of the cheek-plates without disturbing the bearing mounting or support for the sheave or wheel member 2. A simple and practical construction for this purpose is illustrated in the drawings and consists in providing the end members of one of the cheek-plates—for instance, the members 6 of the cheek-plate 3—with headed, dovetailed, or equivalent shaped retaining-tongues 8, offset from the inner faces of the said members 6 and adapted to slide into and out of engagement with correspondingly-shaped shouldered holding-grooves 9, formed in the opposing inner faces of the end members 7 of the opposite cheek-plate 4. These registering and interlocking tongues and grooves 8 and 9, carried by the opposite end members 6 and 7 of the separate cheek-plates, positively prevent a lateral separation of the cheek-plates, while at the same time permitting a ready disconnection of the latter through the medium of a rotary or axial turning movement of the said plates in opposite directions. To permit of and provide for this action, the interlocking tongues and grooves 8 and 9 extend transversely across the inner faces of the end members 6 and 7 and are struck on curved lines concentric with the axis of the sheave or wheel member 2, as plainly shown in detail Figs. 3 and 4 of the drawings. It will thus be seen that when it is desired to open up the pulley-block or casing member to expose the sheave for placing or removing the rope it is simply necessary to simultaneously turn the separate cheek-plates 3 and 4 in opposite directions. This causes the retaining-tongues to slide out of engagement with their complemental holding-grooves 9. A reverse movement carries the tongues back into engagement with the grooves and reëstablishes the interlocked relation of the separate cheek-plates of the pulley-block. This interlocked relation may be maintained, so as to prevent accidental separation or disconnection of the cheeks through the medium of a separate locking device 10, which may conveniently be in the form of a screw or bolt passed through and engaging both of the cheek-plates. However, any equivalent expedient may obviously be resorted to as a separate locking device.

The pulley-block 1 may be provided with any suitable means, as an eye, a hook, or the like, such as common to the ordinary pulley-blocks for the purpose of hanging the same; but an improvement which may be utilized in this connection is shown in Figs. 1 to 4, inclusive, of the drawings and consists in providing the pulley-block with a rope-bridle attachment. This rope-bridle attachment may be formed as an integral part of one of the cheek-plates 3 and essentially consists of a hook element 11, projected from one of the end members 6 of the cheek-plate 3 as an integral part and formed at its bight with a curved rope saddle 12, designed to freely accommodate therein the hanger rope or sling 13. In connection with this integral bridle attachment projected from an end of one of the cheek-plates a practical improvement that may be resorted to consists in forming one end of the hook element with a rabbeted locking-terminal 14, having a matching and registering engagement with a correspondingly-rabbeted seat 15, provided at the extremity of one end of member 7 of the cheek-plate 4, so that when the cheek-plates are in a closed interlocked relation there is a complemental registering fit between the terminal 14 and the seat 15 to provide a flush-joint connection at that point, as clearly illustrated in Figs. 1 and 2 of the drawings. Also, the said rabbeted locking-terminal 14 preferably has formed on the outer side thereof a headed or equivalent-shaped retaining-tongue 16, slidably interlocking with a correspondingly-shaped shouldered holding-groove 17, formed in the inner face of the rabbeted seat 15. The said tongues and grooves 16 and 17 are arranged concentric with the tongues and grooves 8 and 9, so as to have a corresponding locking and interlocking action as the separate cheek-plates are rotated or turned in opposite directions.

While the construction of the bridle attachment is one of the preferred expedients that may be resorted to in carrying out the invention, it will be understood, as stated, that other means may be employed for connecting up the rope sling or hanger with the pulley-block. This part of the invention will of course necessarily vary according to the particular class of equipment with which the pulley-block may be associated.

To provide the improved bearing for the sheave or wheel member 2, the opposite cheek-plates 3 and 4 are formed at their inner sides with the centrally-located inwardly-projected annular bearing-shoulders 18. At the base of the said shoulders the plates are also preferably formed with slightly-offset clearance-shoulders 19, which lie at the outer sides of the sheave-hub 20 and subserve somewhat the function of alining elements for maintaining the sheave correctly positioned within the block-body upon its bearings and at the same time holding the sheave so centered within the block-body as to maintain the same out of contact with the cheek-plates. However, one of the distinctive and important features of the pulley-mounting is the annular bearing-shoulders 18, projected inwardly from the opposite cheek-plates 3 and 4. These wide annular bearing-shoulders 18 constitute the principal bearing-support for the sheave or wheel member and loosely, though snugly, register within the circular bearing-sockets 21, formed in the center of the sheave-hub 20 at opposite sides thereof, as best shown in Fig. 2 of the drawings. It will thus be seen that the sheave-hub 20 has a direct journal or bearing mounting upon oppositely-arranged wide bearing-shoulders 18, thus evenly distributing not only the side strains that may be imposed upon the sheave, but also relieving the shearing strain, which is such an important factor to dispose of in block-and-tackle fixtures. In the preferred construction being described the sheave or wheel member 2 is also provided with a central bearing-opening 23, which receives a hollow journal-stud 24, projected integrally from the inner side of one of the cheek-plates 4 and a sufficient distance beyond the annular bearing-shoulder 18 of such plate to engage a retaining-socket 25, formed centrally in the inner face of the opposite cheek-plate 3. Though not receiving the direct bearing strain of the sheave or wheel member in the same sense as the main annular bearing-shoulders 18, yet the hollow journal-stud 24 constitutes a third central bearing-point for the sheave or wheel member and materially contributes to the even and rigid bearing for the said sheave.

In addition to the function ascribed to it it will be observed that the journal-stud 24 also constitutes a third and central point of engagement between the separate cheek-plates 3 and 4 of the block-body, and therefore combines with the end interlocking connections 8 and 9 to provide for connecting the cheek-plates at a plurality of points, thus greatly strengthening and reinforcing the block-body. At the same time the journal-stud 24 serves in the capacity of a trunnion upon which the cheek-plates rotate when the interlocking elements thereof are turned into and out of engagement.

The journal-stud 24 is hollow throughout, and at the end thereof fitting in the socket 25 the same is provided with a short interiorly-threaded portion 26, adapted to receive the inner end of a retaining-screw 27, the head of which screw engages the cheek-plate 3, and therefore provides means whereby through the tightening up of the same any looseness in the bearing for the sheave or wheel member may be readily taken up. In this particular the screw 27 performs the function of an adjusting device for the bearing, while at the same time necessarily performing its other functions of a retaining member for holding the cheek-plates against lateral separation when disconnected at their ends and that of a closure for one end of the oil-chamber 28, formed in the stud 24. The opposite end of said oil-chamber is closed by a removable screw-closure plug 29.

The oil-chamber 28 is designed to be filled with lubricant, and to provide for distributing the same to the bearings for the sheave or wheel member the stud 24 is provided with circulating-ports 30, piercing the same within the plane of the central bearing-opening 23 of the sheave. In addition to the circulating-ports 30 I also preferably provide in the faces of the annular bearing-shoulders 18 shallow lubricant-pockets 31, which are arranged within the circular plane of the suction-holes 32, formed transversely through the web portion of the sheave-hub 20. The suction-holes 32 are preferably arranged at diametrically opposite points and pierce the web of the hub 20 at an angle or obliquely. The oppositely-located holes 32 are inclined, respectively, in opposite or reverse direction, so that as the sheave or wheel member rotates the same necessarily produces a suction within the holes 32 of sufficient intensity to constantly draw lubricant from the oil-chamber 28 and the pockets 31, so that the same will be distributed to all bearing-points of the sheave or wheel member.

The improvements described are not only serviceable in a single form of pulley-block, but are also applicable to pulleys of the multiple type wherein two, three, or more sheave or wheel members are employed. One embodiment of the invention in a multiple-pulley construction is illustrated in Fig. 7 of the drawings, which shows that in carrying out the invention it is entirely practicable to multiply the number of sheaves or wheels indefinitely and at the same time provide for each of such sheaves or wheel members a bearing-mounting substantially like that already described in connection with a single form of pulley-block. In this multiple-pulley-block construction the general thought preserved throughout is that of constructing the separate parts of the block alternately male and female in order to maintain the idea of the hollow journal-stud carried by one plate and registering in a retaining-socket formed in the directly-opposite plate. This construction is plainly shown in Fig. 7 of the drawings, in which the sectional and separable block-body is represented as being composed of opposite cheek-plates $3^a$ and $4^a$, respectively, and an intermediate body-plate 33. Each of the cheek-plates $3^a$ and $4^a$ has a separable interlocked tongue-and-groove connection $8^a$ with the intermediate body-plate 33, preferably of the same character as that already described in connection with the single form of pulley-block; but by reason of having the cheek-plates $3^a$ and $4^a$, respectively, upon opposite sides of the intermediate plate 33 separate wheel-openings $5^a$ are provided in the block-body for the accommodation therein of a pair of sheaves or wheel members 2. In other respects the bearing-mounting for each of the wheel members 2 in the multiple-pulley formation (shown in Fig. 7) is the same as already described in connection with the single form of pulley-block, as indicated by the same reference-numerals designating similar parts.

Aside from the single and multiple pulley-block formation the improvements described herein may be employed in modified structures—such, for instance, as suggested in Fig. 8 of the drawings. This modification illustrates a form of the invention wherein the position of the several elements of the bearing are transposed or reversed from the positions shown in Fig. 2 of the drawings—i. e., those elements of the bearing carried by the cheek-plates are transposed to the sheave hub, and vice versa. Referring more particularly and definitely to Fig. 8 of the drawings, it will be observed that in the modification shown therein the sheave-hub 20 is provided upon opposite sides thereof with the wide offset annular bearing shoulders $18^a$, snugly, though loosely, turning in the circular bearing-sockets $21^a$, formed centrally in the inner sides or faces of the cheek-plates $3^b$ and $4^b$, respectively. Also in this modified construction the sheave-hub 20 is shown provided at opposite sides thereof with the short outwardly-projecting journal-studs $24^a$, turning in the circular bearing-openings $23^a$, provided in the cheek-plates $3^b$ and $4^b$, thus completing a bearing mounting for the sheave or wheel member in which all the elements of the bearing preserve identically the same operative relation as the bearing elements illustrated in Fig. 2 of the drawings. Furthermore, in the modified construction shown in Fig. 8 of the drawings the bore or opening through the hub 20 of the sheave or wheel member constitutes the oil-chamber $28^a$, from which the lubricant is carried through a plurality of ports $30^a$ to the various points of the bearing provided by the shoulders $18^a$ and the journal-studs $23^a$. To assist in properly maintaining the cheeks together at the center and to provide a trunnion upon which the cheek-plates may be rotated in engaging and disengaging the same, there is employed a retaining-bolt 34, extending longitudinally through the bore or chamber $28^a$ of the sheave-hub and carrying at one end a head 35, engaging upon the outer side of and interlocked with the cheek-plate $3^b$. The other end of the bolt is threaded, as at 36, to accommodate thereon a securing-nut 37, which interlocks with the outer side of the cheek-plate $4^b$. The head 35 and the nut 37 also constitute closures for the ends of the oil-chamber $28^a$.

Other equivalent modifications will readily suggest themselves to those skilled in the art.

From the foregoing it is thought that the construction, operation, and many advantages of the herein-described pulley-block will be readily apparent without further description, and it will be understood that various changes in the form, proportion, and minor details of construction may be resorted to without departing from the scope of the invention or sacrificing any of the advantages thereof.

Having thus described the invention, what is claimed, and desired to be secured by Letters Patent, is—

1. A pulley-block comprising a body member and a wheel member, one of said members having rigid therewith opposite projecting annular bearing-shoulders, and the other member being provided therein with bearing-sockets receiving said shoulders, said registering shoulders and recesses constituting the sole journal-support and bearing for the wheel member.

2. A pulley-block comprising a body member and a wheel member, one of said members having opposite projecting annular bearing-shoulders, and a hollow journal-stud, and the other of said members having opposite bearing-sockets receiving the said shoulders.

3. A pulley-block comprising a block-body consisting of separably-interlocked sections provided with rigid annular bearing-shoulders, and a sheave or wheel member mounted within the block-body and having bearing-sockets receiving said shoulders.

4. A pulley-block comprising a block-body having a wheel-opening and consisting of separate members having a central trunnion connection and interlocking elements slidably engaged and disengaged through rotary or axial movement of said sections, and a sheave mounted within the wheel-opening of the block-body.

5. A pulley-block comprising a block-body consisting of separate cheek-plates having a central trunnion connection and at the ends provided with slidably-interlocked elements moved into and out of engagement through rotary or axial movement of the cheek-plates, and the sheave having a bearing within the body independent of the trunnion action.

6. A pulley-block comprising a block-body consisting of opposite cheek-plates having a central trunnion connection and provided at the ends respectively with interlocking tongues and grooves, and a sheave having a bearing-mounting within the block-body, independent of the trunnion connection.

7. A pulley-block comprising a block-body consisting of opposite cheek-plates, one of which is provided at its ends with headed retaining-tongues, and the other of which is provided in corresponding positions with shouldered holding-grooves receiving and interlocking with said tongues, the interlocking tongues and grooves being arranged concentric with the wheel-axis, and the sheave or wheel member mounted within the block-body.

8. A pulley-block comprising a block member consisting of separate cheek-plates having a central trunnion connection and opposite matching end members, the end members of one of the cheek-plates being provided with headed retaining-tongues extending transversely and arranged on a curve concentric with the trunnion connection, and the other of said members being provided with correspondingly-shouldered holding-grooves receiving the said tongues, and the sheave or wheel member mounted within the block-body.

9. A pulley-block comprising a block-body provided at one end with a bridle attachment and consisting of separably-interlocked cheek-plates, and the sheave mounted within the block-body.

10. A pulley-block comprising separably-interlocked cheek-plates, one of which is provided with a bridle attachment having a separably-interlocked connection with the other cheek-plate, and the sheave mounted within the block-body.

11. A pulley-block comprising a sectional block-body consisting of separate cheek-plates having interlocked connections which are engaged and disengaged through rotary or axial movement of the plates, one of said cheek-plates being provided with a bridle attachment having an interlocked connection with the other cheek-plate, said latter interlocked connection being also engaged and disengaged through the said rotary or axial movement of the cheek-plates, and the sheave.

12. A pulley-block comprising a block-body having opposite cheek-plates provided with centrally-located inwardly-projecting annular bearing-shoulders, one of said plates being further provided at the center in its inner side with a retaining-socket, and the other of said plates being further provided with an offstanding journal-stud having one end there of engaged in said socket, and a sheave or wheel member having a central bearing-opening receiving the journal-stud and also provided at opposite sides of its hub with circular bearing-sockets receiving said annular bearing-shoulders.

13. A pulley-block comprising a block-body having opposite cheek-plates provided at the center with inwardly-projecting annular bearing-shoulders and at the bases of the bearing-shoulders with offset clearance-shoulders, one of said cheek-plates being further provided with a retaining-socket and the other of said plates being provided with a journal-stud fitting in said socket, the sheave or wheel member having its hub arranged between such clearance-shoulders and provided with a central bearing-opening receiving the journal-stud and with opposite bearing-sockets receiving the annular bearing-shoulders, and a retaining and adjusting device engaging one end of the journal-stud and the adjacent cheek-plate.

In testimony whereof I hereunto affix my signature in the presence of two witnesses.

FRANK PAUL WHITESIDE.

Witnesses:
J. K. McCLUNG,
SCOTT ALESHIRE.